(12) United States Patent
Chen et al.

(10) Patent No.: US 7,213,173 B2
(45) Date of Patent: May 1, 2007

(54) CONTROL DEVICE FOR PREVENTING HARDWARE STRAPPING FAULT OF COMPUTER SYSTEM

(75) Inventors: Shih-Meng Chen, Sinjhuang (TW); Chun-Hui Lin, Taipei (TW)

(73) Assignee: Mitac Technology Corp., Hsin-Chu Hsien (TW)

(*) Notice: Subject to any disclaimer, the term of this patent is extended or adjusted under 35 U.S.C. 154(b) by 511 days.

(21) Appl. No.: 10/866,734

(22) Filed: Jun. 15, 2004

(65) Prior Publication Data

US 2005/0278573 A1    Dec. 15, 2005

(51) Int. Cl.
*G06F 11/00* (2006.01)
(52) U.S. Cl. .................................. 714/36; 714/3
(58) Field of Classification Search .............. 714/3, 714/27, 36; 713/1, 2
See application file for complete search history.

(56) References Cited

U.S. PATENT DOCUMENTS

| | | | |
|---|---|---|---|
| 5,051,622 A * | 9/1991 | Pleva | 326/38 |
| 5,608,341 A * | 3/1997 | Andersson | 326/38 |
| 5,777,488 A * | 7/1998 | Dryer et al. | 326/38 |
| 6,845,444 B2 * | 1/2005 | Su et al. | 713/1 |
| 2004/0230701 A1 * | 11/2004 | Sukigara | 709/253 |
| 2006/0095645 A1 * | 5/2006 | Lin et al. | 710/316 |

* cited by examiner

*Primary Examiner*—Marc Duncan
(74) *Attorney, Agent, or Firm*—Rosenberg, Klein & Lee

(57) ABSTRACT

Disclosed is a control device for preventing hardware strapping fault of a computer system. The computer system includes a central processing unit having a first signal pin, an integrated circuit device having at least one hardware strapping pin, and an external device coupled to the computer system and having a second signal pin. The hardware strapping pin is a multiplexing pin that generates a hardware strapping signal to the central processing unit to perform a hardware strapping operation at the time when the system is being powered on and, after the hardware strapping is completed, is connectable to the second signal pin of the external device. The control device includes a hardware strapping fault prevention circuit coupled between the hardware strapping pin of the integrated circuit device and the second signal pin of the external device to isolate the second signal pin of the external device from the first signal pin of the central processing unit at the time when the system is being powered on.

8 Claims, 4 Drawing Sheets

CONTROL DEVICE FOR PREVENTING HARDWARE STRAPPING FAULT OF COMPUTER SYSTEM

BACKGROUND OF THE INVENTION

1. Field of the Invention

The present invention relates generally to field of detection of fault of a computer system, and in particular to a control device that prevents hardware strapping fault of integrated circuit (IC) device of the computer.

2. The Related Art

With the continuous improvement of computer capacity, hardware architecture of the computer becomes increasingly complicated. In response to such a trend, computer designers and manufactures are facing challenge of developing computers of high performance and high quality under the constraints of limited footprint and limited number of pins. Thus, most of the integrated circuit devices incorporated in the computers are of a multiplexing configuration. In other words, a single pin of the integrated circuit may perform a variety of operations.

FIG. 1 of the attached drawings shows a simplified functional circuit block diagram of an existing computer system, which comprises a central processing unit 10 connected to a north bridge 11 via a host bus. The north bridge 11 is also referred to as "Host Bridge". A main memory 12 is coupled to the north bridge 11 via a memory bus. An accelerated graphic port (AGP) display device 13 is coupled to the north bridge 11 via an AGP bus.

The north bridge 11 is coupled to a south bridge 14 via a high speed bus, such as a V-Link bus that has a data transmission rate as high as 266 Mb per second. The south bridge 14 is connected to a plurality of peripheral component interconnect (PCI) slots 15, which allows for connection with PCI devices (not shown) of different functions, via a PCI bus. The south bridge 14 is also connectable with an IDE interface based external device 16, such as an optic disk drive, via an IDE bus.

In such a computer system, multi-frequency, multiplexing clock generator 17 is incorporated to provide a variety of clocking signals to the previously-mentioned components and devices as working frequencies thereof.

One of the multiplexing pins of the IC devices incorporated in a computer system is the so-called "hardware strapping pin", which is locked in a rising edge or falling edge of a system reset signal in order to determine initial condition of hardware and which returns to original pin function after the reset cycle. Since the hard strapping pin is of a multiplexing design, mis-determination often occurs when an external device is connected to the computer.

Taking the computer system of FIG. 1 as an example, the clock generator 17, such as model number ICS950902 which is a 8375 clock generator, has three hardware strapping pins, namely pin numbers 6 (Model_SEL), 7 (CPU_SEL), and 10 (FS1). The FS1 pin is coupled to the central processing unit 10 and the south bridge 14, respectively. In powering on, the FS1 pin of the clock generator 17 straps a signal from the central processing unit 10 in order to provide correct working frequency f1, such as 100/133 MHz, via a clock signal output pin CPU_CLK, to the central processing unit 10. Thereafter, the FS1 pin of the clock generator 17 is converted into an output pin that supplies a working frequency f2, such as 33 MHz, to the PCI bus of the south bridge 14.

Taking the south bridge 14, such as 8375 south bridge chip, as another example, the south bridge 14 has a hardware strapping pin SDA1 connected to an output pin Y3 of the central processing unit and a signal pin SDA1' of the external device 16. In powering on, the hardware strapping pin SDA1 of the south bridge 14 performs hardware strapping over the signal pin Y3 of the central processing unit 10 and, thereafter, the hardware strapping pin SDA1 of the south bridge 14 is converted into an output pin, serving as a signal pin between the external device 16 and the south bridge 14.

Normally, when the hardware strapping pin SDA1 of the south bridge 14 performs hardware strapping over the central processing unit 10, the south bridge 14 receives a low-level signal generated by the central processing unit 10. However, in case the signal pin SDA1' of the external device 16 comprises an internal pull-high resistor, when the hardware strapping pin SDA1 of the south bridge 14 is strapping the central processing unit 10, the external device 16 is in an initialization process, which causes an incorrect result of the hardware strapping performed by the SDA1 pin of the south bridge 14. Further, in case of a mismatch in timing occurs between the external device 16 and the south bridge 14 and the central processing unit 10, incorrect result of the hardware strapping occurs similarly. Besides the computer system discussed above, a variety of control device and equipment that operates on the basis of digital signals and requires connection with external devices encounter such hardware strapping problems.

SUMMARY OF THE INVENTION

Thus, to alleviate the above problem, a primary object of the present invention is to provide a control device that prevents hardware strapping fault of computer.

Another object of the present invention is to provide a control device that ensures a correct latching signal when conflict occurs between hardware strapping and signals provided by an external device.

To achieve the above objects, in accordance with the present invention, there is provided a control device for preventing hardware strapping fault of a computer system, wherein the computer system comprises a central processing unit having a first signal pin, an integrated circuit (IC) device having at least one hardware strapping pin, and an external device coupled to the computer system and having a second signal pin and the hardware strapping pin is a multiplexing pin that generates a hardware strapping signal to the central processing unit to perform a hardware strapping operation at the time when the system is being powered on and, after the hardware strapping is completed, is connectable to the second signal pin of the external device. The control device comprises a hardware strapping fault prevention circuit coupled between the hardware strapping pin of the IC device and the second signal pin of the external device to isolate the second signal pin of the external device from the first signal pin of the central processing unit at the time when the system is being powered on. The IC device comprises a bridge of the computer and the external device comprises an electronic peripheral device connected to the bridge by an IDE bus. With such an arrangement, faults of hardware strapping are effectively prevented from occurring at the time when the computer system is being powered on and the hardware strapping operation is being performed. The computer system may correctly detect the operating environment that the system is in to ensure correct operation thereof.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF PREFERRED EMBODIMENTS

The present invention offers a control device employing a technique for preventing hardware strapping fault, which can be incorporated in an electronic digital system, such as a computer system, comprising a central processing unit, an integrated circuit (IC) device that has at least one hardware strapping pin, and an external device connected to the system, wherein the hardware strapping pin is a multiplexing pin that provides a hardware strapping signal to the central processing unit when the system is being powered on and, after the strapping is done, establishes a connection with a signal pin of the external device. The IC device can be a bridge of the computer, while the external device is an electronic peripheral device connected to the bridge by a bus, such as an optic disk drive connected to the computer bridge by an IDE bus.

Figure 1:
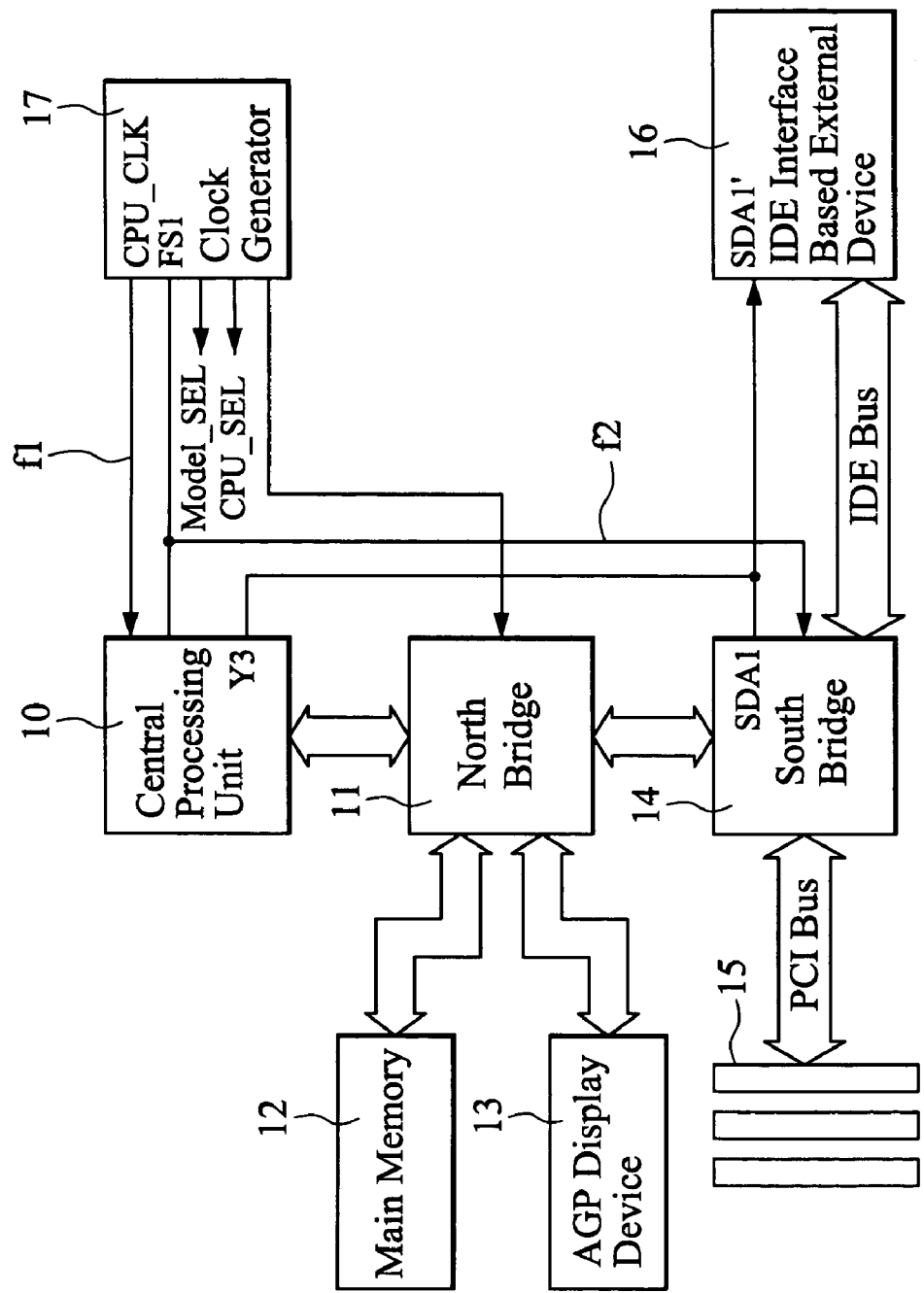
FIG. 1 is a simplified functional circuit block diagram of a conventional computer system.
Figure 2:
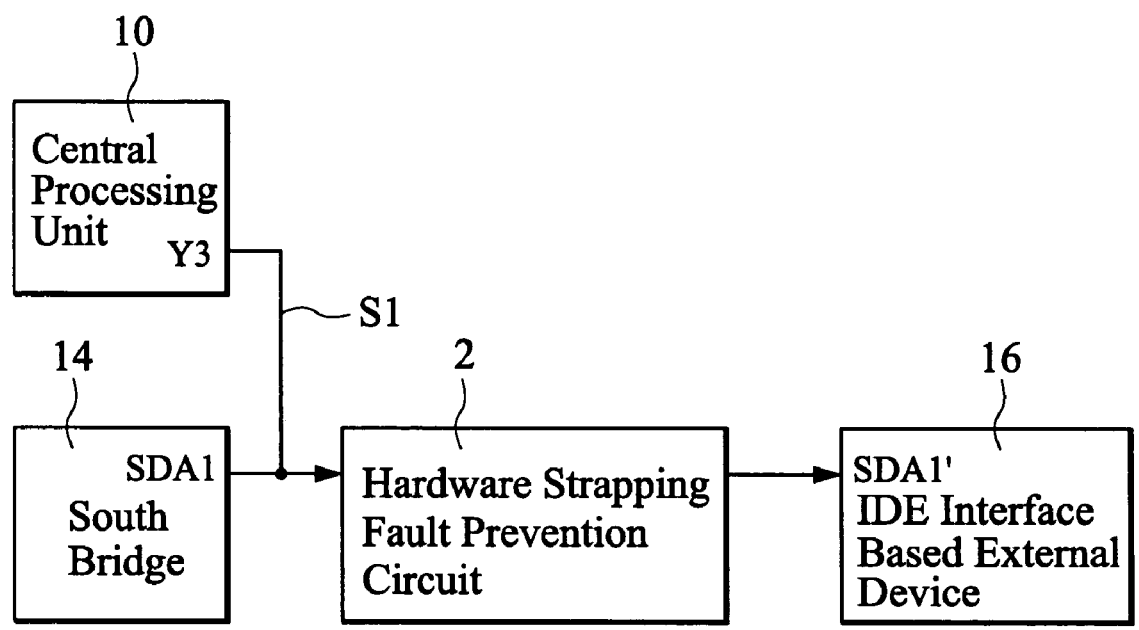
FIG. 2 is a circuit block diagram of a computer system in which the present invention is embodied.

With reference to the drawings and in particular to FIG. 2, a computer system in which the present invention is embodied is shown. The computer system comprises a central processing unit 10, an IC device, such as a computer south bridge 14, having at least one hardware strapping pin SDA1, and an external device 16 connected to the computer system. The hardware strapping pin SDA1 of the south bridge 14 is a multiplexing pin, which provides a hardware strapping signal S1 to the central processing unit 10 when the computer system is being powered on and, after the strapping is completed, establishes an electrical connection with a signal pin SDA1' of the external device 16.

In accordance with the present invention, the control device for preventing hardware strapping fault comprises a hardware strapping fault prevention circuit, generally designated with reference numeral 2, arranged between the hardware strapping pin SDA1 of the south bridge 14 and the signal pin SDA1' of the external device 16. The circuit 2 isolates, in the sense of signal communication, the signal pin SDA1' of the external device 16 from the signal pin Y3 of the central processing unit 10 at the time the computer system is being powered on.

Thus, the hardware strapping pin SDA1 of the south bridge 14 can perform correct hardware strapping over the signal generated by the signal pin Y3 of the central processing unit 10 at the time when the system is being powered on, in order to determine multiplication of frequency on which the central processing unit 10 is to work on. After the hardware strapping is completed, the hardware strapping fault prevention circuit 2 releases the isolation to restore a connection between the hardware strapping pin SDA1 of the south bridge 14 and the signal pin SDA1' of the external device 16, converting the hardware strapping pin SDA1 of the south bridge 14 into an output pin that supplies output signals to the signal pin SDA1' of the external device 16.

In a power-on process, the external device 16 is being initialized at the same time when the computer system is being powered on and the hardware strapping pin SDA1 performs hardware strapping over the central processing unit 10. Thus, when the hardware strapping pin SDA1 of the south bridge 14 completes the hardware strapping operation, the initialization of the external bridge 16 is also done. The provision of the hardware strapping fault prevention circuit 2 allows the hardware strapping operation performed by the south bridge 14 to be done at a time not corresponding to the initialization of the external device, which prevents conflict of signals thereby eliminating fault of hardware strapping.

Figure 3:
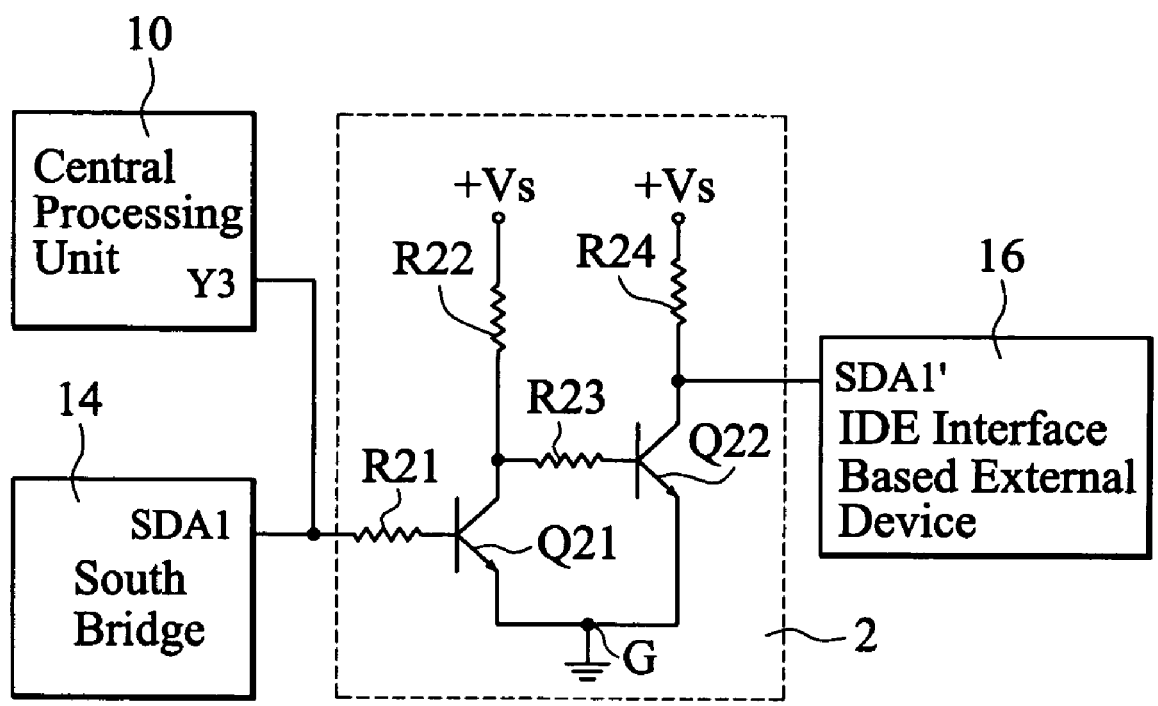
FIG. 3 is a circuit diagram of a control device that prevents hardware strapping fault in accordance with a preferred embodiment of the present invention.

Also referring to FIG. 3, which shows a circuit diagram of the hardware strapping fault prevention circuit 2 in accordance with an embodiment of the present invention, the circuit 2 comprises a plurality of resistors R21–R24, a first switching element Q21, and a second switching element Q22. Examples of the first and second switching elements Q21 and Q22 are transistors, wherein the first element switching element Q21 has a base terminal that is connected by a resistor R21 to the hardware strapping pin SDA1 of the south bridge 14, a collector terminal that is connected by resistor R22 to a power supply +Vs and also connected by a resistor R23 to a base terminal of the second switching element Q22. The second switching element Q22 has a collector terminal that is connected to the signal pin SDA1' and is also connected by a resistor R24 to the power supply +Vs.

With the hardware strapping fault prevention circuit 2, at the time when the computer system is being powered on, the hardware strapping pin SDA1 is allowed to correctly strap over the signal generated by the signal pin Y3 of the central processing unit 10 and after the strapping has been completed, the hardware strapping pin SDA1 of the south bridge 14 is allowed to timely connect to the signal pin SDA1' of the external device 16 by the circuit arrangement comprised of the resistors R21–R24 and the first and second switching elements Q21 and Q22. Thus, fault is prevented in the strapping of the central processing unit 10 by the hardware strapping pin SDA1 of the south bridge 14.

Figure 4:
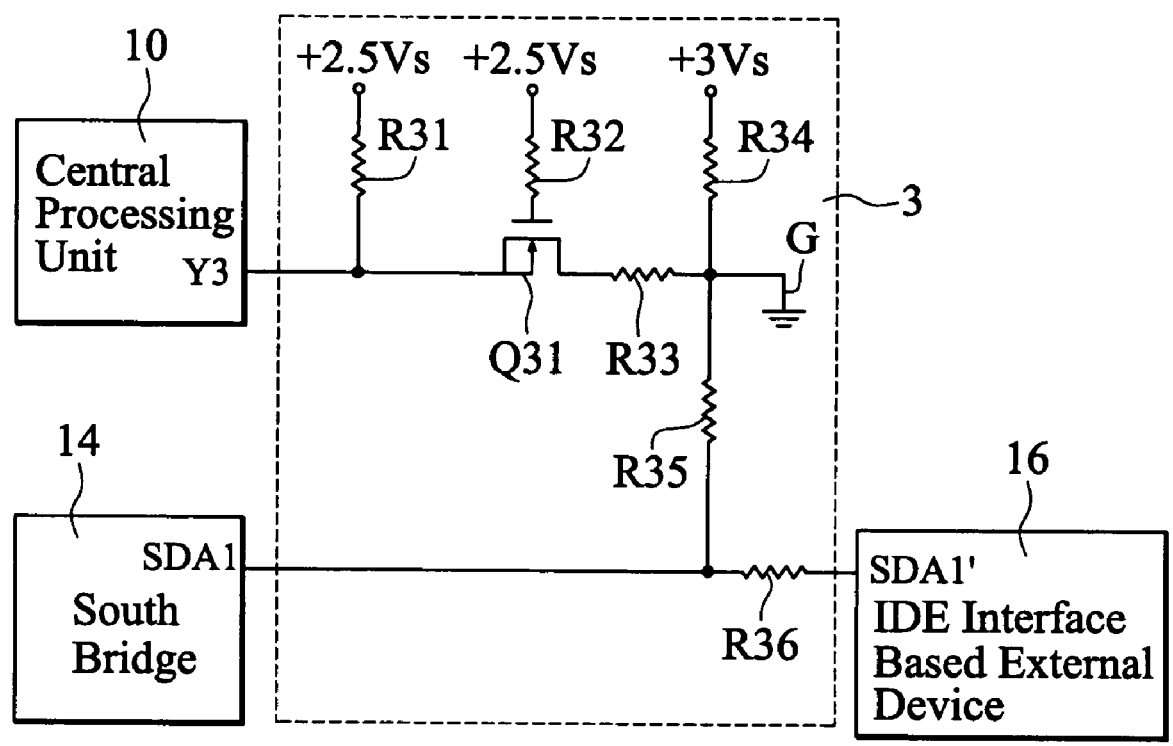
FIG. 4 is a circuit diagram of a control device that prevents hardware strapping fault in accordance with another embodiment of the present invention.

Another embodiment of the hardware strapping fault prevention circuit of the present invention is illustrated in FIG. 4, which is designated with reference numeral 3 for distinction. The hardware strapping fault prevention circuit 3 comprises a plurality of resistors R31–R36 and a switching element Q31. An example of the switching element Q31 is a MOS transistor, which has a source terminal connected to the signal pin Y3 of the central processing unit 10, a gate terminal connected to a power supply of +2.5Vs by a resistor R32 and a drain terminal connected to a reference voltage by a resistor R33. In the embodiment illustrated, the reference voltage is a ground voltage G. The hardware strapping pin SDA1 of the south bridge 14 is connected to the ground G by a pull-low resistor R35 and is also connected to the signal pin SDA1' of the external device 16 by a resistor R36. The pull-low resistor R35 has a resistance of, for example, 2.7 KΩ, serving as a buffering resistance.

The hardware strapping fault prevention circuit 3 provides an equivalent pull-low resistance in the initialization of the external device when the south bridge 14 performs hardware strapping, which pull-low resistance forces the signal generated by the signal pin Y3 of the central processing unit 10 to quickly convert into high level or low level to ensure correct hardware strapping. Although a pull-low resistor is taken as an example in the embodiment, it is apparent to those skilled in the art the selectively use a pull-high/pull-low resistance in accordance with signal level or a pull-low/pull-high resistance incorporated in the external device.

With the technique disclosed in the present invention, faults of hardware strapping operation may be prevented or eliminated when a computer device performs hardware strapping, which is of particular use in both computers and other electronic digital devices.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A computer system comprising:
   a central processing unit having at least one first signal pin;
   an integrated circuit device having at least one hardware strapping pin coupled to the first signal pin of the central processing unit;
   an external device coupled to the computer system and having a second signal pin;
   the hardware strapping pin of the integrated circuit device being a multiplexing pin that generates a hardware strapping signal to first signal pin of the central processing unit to perform a hardware strapping operation at the time when the system is being powered on and, after the hardware strapping is completed, is connectable to the second signal pin of the external device; and
   a hardware strapping fault prevention circuit coupled between the hardware strapping pin of the integrated circuit device and the second signal pin of the external device to isolate the second signal pin of the external device from the first signal pin of the central processing unit at the time when the computer system is being powered on.

2. The computer system as claimed in claim 1, wherein the integrated circuit device comprises a computer bridge having a bus, and wherein the external device comprises an electronic peripheral device connectable to the computer bridge by the bus.

3. The computer system as claimed in claim 2, wherein the computer bridge comprises a south bridge that is connected to the external device.

4. The computer system as claimed in claim 1, wherein the hardware strapping fault prevention circuit comprises a switching element that, at the time when the system is being powered on and the integrated circuit device is strapping over the central processing unit, isolates the second signal pin of the external device from the first signal pin of the central processing unit to eliminate conflict between the hardware strapping signal and a signal generated during the initialization of the external device.

5. The computer system as claimed in claim 1, wherein the hardware strapping fault prevention circuit comprises a buffering resistor having a first end connected to a reference voltage and a second end connected to the hardware strapping pin of the integrated circuit device, the first signal pin of the central processing unit being connected to the reference voltage by a switching element wherein when the integrated circuit device is performing a strapping over the central processing unit at the time that the external device is being initialized, the buffering resistor forces a signal generated by the first signal pin of the central processing unit to quickly convert into high-level or low-level to ensure correct hardware strapping.

6. The computer system as claimed in claim 5, wherein the reference voltage is a ground voltage.

7. The computer system as claimed in claim 5, wherein the buffering resistor comprises a pull-low resistor.

8. The computer system as claimed in claim 5, wherein the buffering resistor comprises a pull-high resistor.

* * * * *